United States Patent
Xu et al.

(10) Patent No.: US 7,297,295 B2
(45) Date of Patent: Nov. 20, 2007

(54) HIGHLY BRIGHT MECHANOLUMINESCENCE MATERIAL AND PROCESS FOR PRODUCING THE SAME

(75) Inventors: Chao-Nan Xu, Tosu (JP); Morito Akiyama, Tosu (JP); Wensheng Shi, Chapel Hill, NC (US)

(73) Assignees: Japan Science and Technology Agency, Saitama (JP); National Institute of Advanced Science and Technology, Tokyo (JP)

( * ) Notice: Subject to any disclaimer, the term of this patent is extended or adjusted under 35 U.S.C. 154(b) by 265 days.

(21) Appl. No.: 10/519,936

(22) PCT Filed: Jul. 11, 2003

(86) PCT No.: PCT/JP03/08853

§ 371 (c)(1),
(2), (4) Date: Dec. 29, 2004

(87) PCT Pub. No.: WO2004/007637

PCT Pub. Date: Jan. 22, 2004

(65) Prior Publication Data

US 2005/0224760 A1    Oct. 13, 2005

(30) Foreign Application Priority Data

Jul. 12, 2002    (JP) .............................. 2002-203781

(51) Int. Cl.
*C09K 11/88*    (2006.01)
*G01L 1/24*    (2006.01)

(52) U.S. Cl. ........................ 252/301.6 S; 252/301.4 S; 252/301.4 R; 252/301.6 R

(58) Field of Classification Search ......... 252/301.4 S, 252/301.6 S, 301.4 R, 301.6 R; 423/263, 423/518, 517, 511, 508, 593.1
See application file for complete search history.

(56) References Cited

U.S. PATENT DOCUMENTS

| | | | | |
|---|---|---|---|---|
| 2,541,384 A | * | 2/1951 | Rothschild | 252/301.6 S |
| 2,743,237 A | * | 4/1956 | Froelich | 252/301.6 S |
| 3,178,611 A | * | 4/1965 | Vogel | 315/363 |
| 4,374,037 A | * | 2/1983 | Takahashi | 252/301.4 S |
| 6,117,574 A | * | 9/2000 | Watanabe et al. | 428/698 |
| 6,265,068 B1 | * | 7/2001 | David et al. | 428/403 |

FOREIGN PATENT DOCUMENTS

| | | |
|---|---|---|
| EP | 0 446 746 | 3/1996 |
| JP | 64-63295 | 3/1989 |
| JP | 9-115464 | 5/1997 |
| JP | 10-223370 | 8/1998 |

* cited by examiner

*Primary Examiner*—C. Melissa Koslow
(74) *Attorney, Agent, or Firm*—Wenderoth, Lind & Ponack, L.L.P.

(57) ABSTRACT

A novel highly bright mechanoluminescence material free from decay of luminescence brightness even if repeated stress is applied, comprising a composite semiconductor crystal of the general formula $xM^1A^1 \cdot (1-x)M^2A^2$ (wherein each of $M^1$ and $M^2$ independently represents an atom selected from among Zn, Mn, Cd, Cu, Eu, Fe, Co, Ni, Mg and Ca, and each of $A^1$ and $A^2$ is an atom independently selected from among chalcogens, provided that $M^1A^1$ is different from $M^2A^2$; and x is a positive number less than 1); and a process for producing the same.

2 Claims, 3 Drawing Sheets

HIGHLY BRIGHT MECHANOLUMINESCENCE MATERIAL AND PROCESS FOR PRODUCING THE SAME

TECHNOLOGICAL FIELD

The present invention relates to a novel mechanoluminescence material or, namely, a material emitting light by conversion of a mechanical energy to a light energy as well as to a method for the preparation thereof.

BACKGROUND TECHNOLOGY

There are known heretofore, as a light-emitter which emits light by stimulation from outside, phosphors for fluorescent lamps which are subject to excitation by ultraviolet light, phosphors for plasma displays, phosphors for high-speed electron excitation which are subject to excitation with electron beams, phosphors for fluorescence character-indicating tubes, phosphors for radiations excitable by a radiation such as X-rays and the like, fluorescence-regenerating phosphors excitable with heat or infrared light such as those for solid scintillators and the like, accelerated phosphors, infrared-visible conversion phosphors and others.

As for a material capable of emitting light by an external mechanical force, on the other hand, the inventors previously made proposals, in conducting preparation of a high-brightness stress light-emitting material formed from an aluminate having a non-stoichiometric composition and having lattice defects emitting light when carriers excited by mechanical energy return to the ground state or in conducting preparation of a high-brightness light-emitting material with an aluminate as the matrix substance containing, in the above matrix substance, metal ions selected from rare earth metal ions or transition metal ions as the center ions of the center of luminescence (official publication of Japanese Patent Kokai No. 2001-49251), for a method for the preparation of a high-brightness light-emitting material (official publication of Japanese Patent Kokai No. 2002-220587) characterized by comprising: mixing an aluminum alcoholate and water-soluble compounds of the ingredient metals other than aluminum in an aqueous medium followed by conversion into alkalinity so as to form a colloid, then subjecting the same to high-speed drying with addition of a dispersion-stabilizing agent to form a dried material having the dispersion-stabilizing agent deposited on the surface of the colloidal particles followed by calcination of this dried material in an oxidizing atmosphere at 500 to 900° C. and pulverizing the thus calcined material into a powder which is, before or after molding, fired in a reducing atmosphere at 1000 to 1700° C.

However, the mechanoluminescence materials known heretofore have unavoidably limited application fields in respect of their insufficient luminescence brightness and in respect of attenuation of their luminescence brightness as a stress is repeatedly applied thereto.

DISCLOSURE OF THE INVENTION

The present invention has been completed under these circumstances with an object to provide, by overcoming the defects possessed by the prior art mechanoluminescence materials, a novel mechanoluminescence material having high brightness and free from attenuation of the luminescence brightness even by repeated application of a stress.

The inventors have continued extensive investigations in order to improve the defects possessed by the prior art mechanoluminescence materials and, as a result, to develop a novel mechanoluminescence material exhibiting a greatly improved efficiency for the conversion of a mechanical energy to an energy of light and, as a result, have arrived at a discovery that a material having a constitution by composite-formation of a specified semiconductor and, by modifying the preparation method, having adequately controlled crystalline grain size and defects or strain of the crystalline lattice can be a stable and high-brightness mechanoluminescence material leading to completion of the present invention on the base of this discovery.

Namely, the present invention provides a high-brightness mechanoluminescence material consisting of a composite semiconductor crystal represented by the general formula

$$xM^1A^1 \cdot (1-x)M^2A^2 \qquad (I)$$

($M^1$ and $M^2$ in the formula are, each independently from the other, an atom selected from among Zn, Mn, Cd, Cu, Eu, Fe, Co, Ni, Mg and Ca, $A^1$ and $A^2$ are, each independently, an atom selected from chalcogens with the proviso that $M^1A^1$ and $M^2A^2$ differ each from the other and x is a positive number smaller than 1), as well as a method for the preparation of a high-brightness mechanoluminescence material comprising the steps that the source materials of the constituent elements are blended in a specified proportion, the thus obtained mixture is subjected to heating in vacuum at a temperature lower than the sublimation point of the product to form a composition corresponding to the aforementioned general formula (I), the said composition is subjected to sublimation at a temperature equal to or higher than the sublimation point of the said composition and the generated sublimate is condensed at a temperature lower than the sublimation point to effect crystallization.

BEST MODE FOR CARRYING OUT INVENTION

The present invention is constituted of a composite body of a semiconductor represented by the general formula $M^1A^1$ (II) and a semiconductor represented by the general formula $M^2A^2$ (III). The $M^1$ and $M^2$ in these general formulas are selected from among Zn, Mn, Cd, Cu, Eu, Fe, Co, Ni, Mg and Ca and they can be a single kind or a combination of two kinds or more with respect to each of the $M^1$ and $M^2$. Though depending on the cases, it is possible to replace a part of these metals with other metals known for replacement in conventional semiconductors such as, for example, Al or Ga for Zn, Hg for Cd and Sr and the like for Ca.

In the next place, the $A^1$ and $A^2$ which are each a non-metal usable to form a semiconductor by being bonded with these metals include chalcogens or, namely, the oxygen group elements. The chalcogens include oxygen, sulfur, selenium, tellurium and polonium of which polonium is less preferable due to its high metallic nature. While it is usual that these chalcogens are used singly relative to each of the $A^1$ and $A^2$, they can be a combination of two kinds or more, if so desired. It is further optional to replace them with other non-metallic elements such as, for example, silicon, nitrogen, boron, arsenic and the like within a range not to cause a decrease in the properties as the semiconductor.

Figure 1:
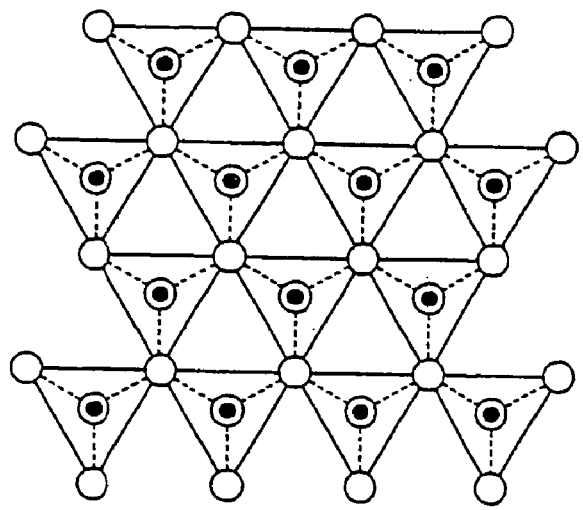
FIG. 1 is a plan view showing a model of the wurtzite-type structure.
Figure 2:
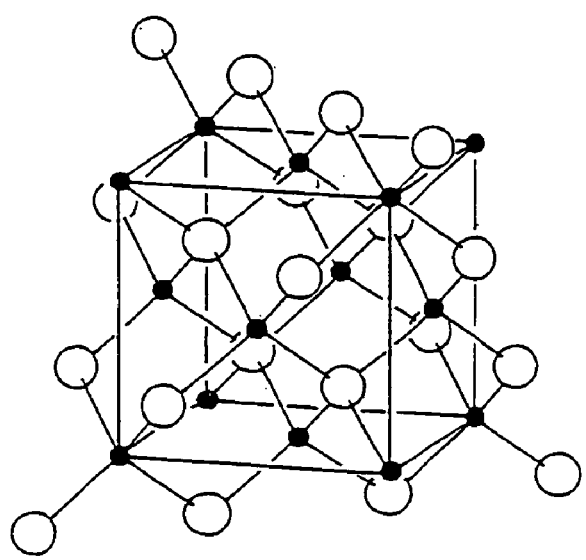
FIG. 2 is a perspective view showing a model of the zincblende-type structure.

The mechanoluminescence material of the present invention is preferably constituted of an oxide, sulfide, selenide or telluride as the principal ingredients having a structure With coexistence of the wurtzite-type structure and zincblende-type structure. The wurtzite-type structure here implied is a crystalline structure in which the positive element $M^1$ (marked with ●) and the negative element $A^1$ (marked with ○) arranged as shown in FIG. 1 which is formed by $M^1 A^1_4$ tetragons jointly possessing each of the corners. And, the zincblende-type here implied is, as is illustrated in FIG. 2, a structure in which unit layers of a wurtzite-type structure formed from $M^1$ (● marks) and $A^1$ (○ marks) are laid one on the other in such a fashion that the $M^1$s (● marks) are arranged in the cubic closest packing structure.

In the mechanoluminescence materials of the present invention, it is preferable in respect of the particularly high stress luminescence intensity that the $M^1$ is Mn and the negative elements of $M^1 A^1$ and $M^2 A^2$ or, namely, $A^1$ and $A^2$, are each the same chalcogen as the other in the composition as exemplified by the compositions of, for example, $Mn_x Zn_{1-x} S$, $Mn_x Zn_{1-x} Te$, $Mn_x Cd_{1-x} S$, $Mn_x Zn_{1-x-y} Cu_y S$ (where $0<x<0.5$ and $0<y<1-x$). Furthermore, a material exhibiting a strong stress luminescence like a laser beam can be obtained when the material is constituted from microcrystals having no or minimum strains.

In the following, a description is given of a method for the preparation of the mechanoluminescence material of the present invention. The source materials for forming the semiconductor represented by the above-given general formula (II) and the source materials for the semiconductor represented by the above-given general formula (III) are blended in a specified proportion corresponding to x in the range of, for example, from 0.01 to 99.99 or, preferably, from 0.1 to 99.9 and the same taken to fill a quartz tube is heated under vacuum to cause, by utilizing the temperature gradient, sublimation of the starting materials at the higher temperature end and re-crystallization at the lower temperature end. It is preferable in this case to use a small amount of a chalcogen or halogen as a circulation gas to promote the sublimation. This circulation gas is used in the range from 0.01 to 10 mg per unit volume 1 $cm^3$ of the quartz tube.

In this way, a desired semiconductor is synthesized from the starting materials filling the quartz tube at a temperature lower than the sublimation point followed by sublimation of the same at a temperature equal to or higher than the sublimation point to cause condensation by leading the same to a low-temperature zone so that a high-brightness mechanoluminescence material is obtained. In this case, the quartz tube is evacuated to vacuum and, after flushing with argon or hydrogen, the inside thereof is brought to high vacuum of $10^4$ Pa or below or, preferably, $10^{-2}$ Pa or below so as to accomplish improvement of the light-emitting intensity.

In the mechanoluminescence material of the present invention, the stress luminescence intensity depends on both of the crystal grain diameter and the lattice strain. Namely, the luminescence intensity is decreased as the crystal grain diameter is increased and a high luminescence intensity is exhibited as the crystal grain diameter is decreased, for example, to nano-size crystal grains. It is usually preferable that the crystal grain diameter does not exceed 35 nm or, in particular, does not exceed 20 nm. The crystal grain diameter can be determined by X-ray diffractometry.

Further, the luminescence intensity is greatly decreased in the existence of strain in the grains so that fine grains having little strains should be prepared to obtain a high luminescence intensity. Simultaneous analyses can be undertaken by the X-ray diffractometry for the crystal grain size and strain in the crystals. Namely, the crystal grain size and the strain in the lattice can be simultaneously obtained by bringing the pseudo-Voigt equation into profile fitting to a diffractometric diagram of a broad range to independently determine the half-value widths in the Gaussian distribution and Lorentz distribution (see "Material analyses by powder X-ray diffractometry" by Takamitsu YAMANAKA, published by Kodan-sha, Jun. 1, 1993, page 95).

The luminescence intensity of the mechanoluminescence material of the present invention is subject to changes depending on the value of the mechanical energy to be the excitation source or, namely, the mechanical interaction. While the luminescence intensity of a mechanoluminescence material is generally increased as the mechanical interaction force is increased, a smallest energy or, namely, a threshold value is found in the mechanical interaction force to cause light emission. While this threshold value is subject to changes depending on the composition of the material with wide variations ranging from those emitting light even with a small energy of less than 1N to those capable of emitting light only by application of a large energy to approach destruction of the material, the mechanoluminescence material of the present invention can emit light by application of only an extremely small outer force.

While the mechanoluminescence material of the present invention can be in a powder form as such, it can be shaped in the form of a block or a coating film and further it can be worked into a laminated body or a composite with a plastic.

With regard to the mechanoluminescence material of the present invention, it is possible to obtain any ones as desired having a grain diameter ranging from the nano size to the mm size by controlling the firing conditions in the preparation thereof. And, the ultrafine grains having a submicron or smaller grain diameter obtained in this way can emit intense light like laser beams by receiving a stimulation of a mechanical outer force and this luminescence is never subject to attenuation with stability even by repeated application of mechanical outer forces.

In the following, the present invention is described in more details by way of examples although the present invention is never limited by these examples.

EXAMPLE 1

A quartz tube was filled with a blend of ZnCuS and MnS in a proportion of 9.9:0.1 by the molar ratio followed by pressure reduction of inside of the quartz tube down to $10^{-2}$ Pa and heating and firing at 900° C. for 24 hours. By using an electric furnace suitable for control of the temperature distribution gradient, thereafter, the above formed ZnCuMnS was gathered to one end portion of the quartz tube and the temperature of the portion was increased to 1100° C. while the other end portion was kept at 900° C. to continue the heating for 7 days so that the ZnCuMnS was crystallized by sublimation at the higher-temperature side and condensation at the lower-temperature side.

The grain diameter of the fine crystals obtained in this way was determined by the X-ray diffractometry and shown in Table 1.

Figure 3:
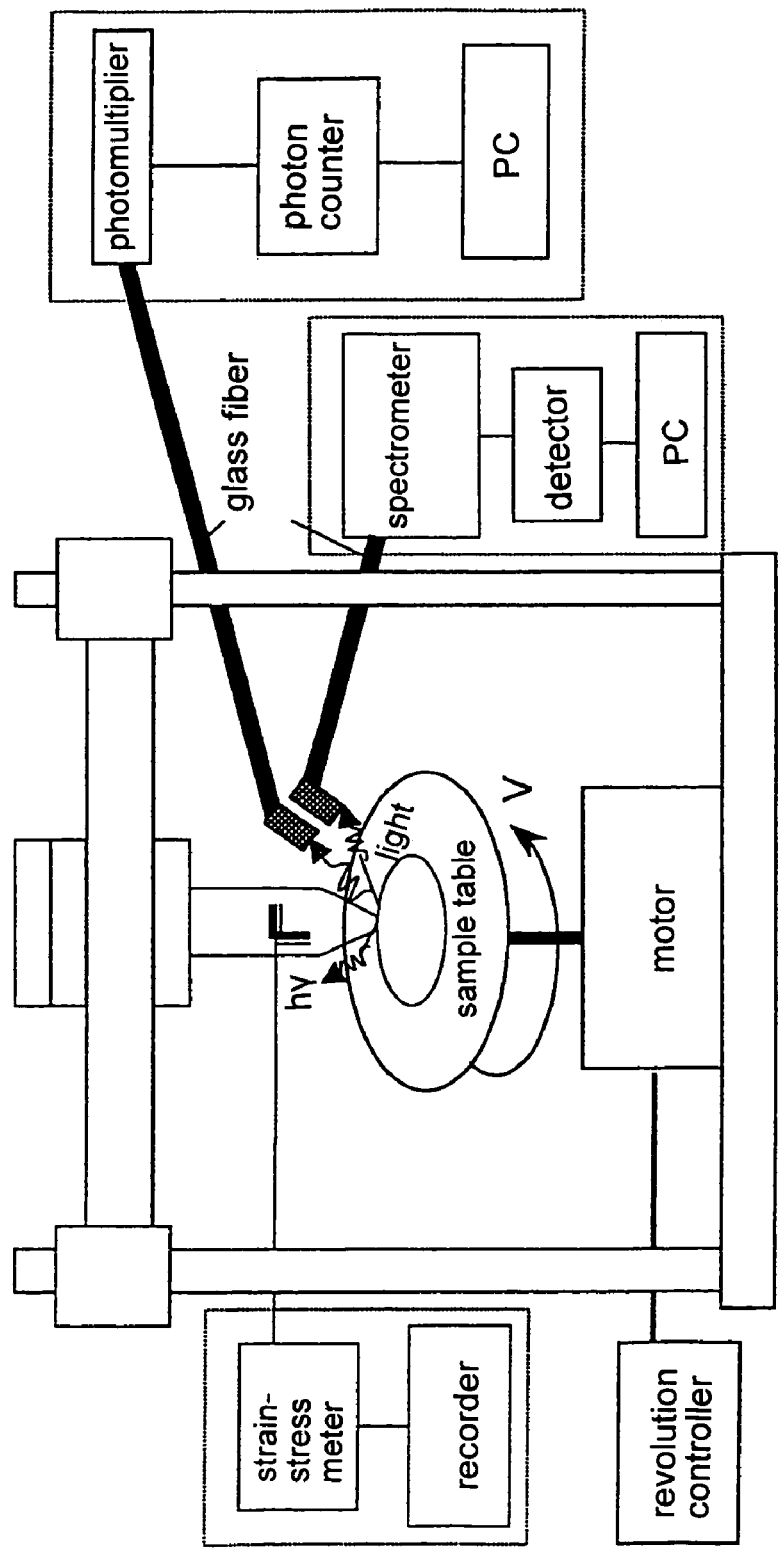
FIG. 3 is an illustration showing the structure of the rubbing-testing machine used in Example 1.
Figure 4:
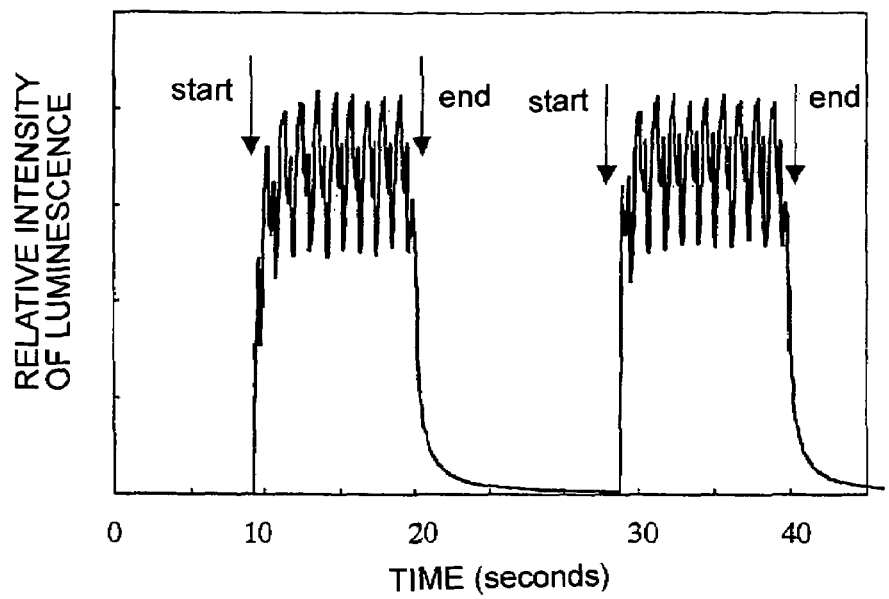
FIG. 4 is a graph showing the changes of the luminescence intensity in the lapse of time in Example 1.

In the next place, the mechanoluminescence material obtained in this manner was subjected to light emission by repeating excitation under application of a load of 0.2N by using a rubbing testing machine having a structure illustrated in FIG. 3 (60 rpm revolution, a transparent resin-made rubbing rod having an end point of 1 mm diameter used). FIG. 4 is a graph showing the changes with time in the luminescence caused here. As is understood from this figure, this luminescence is never subject to attenuation even by repeated application of the load.

The relative value of the stress luminescence intensity here against $SrAl_2O_4$:Eu is shown in Table 1.

Figure 5:
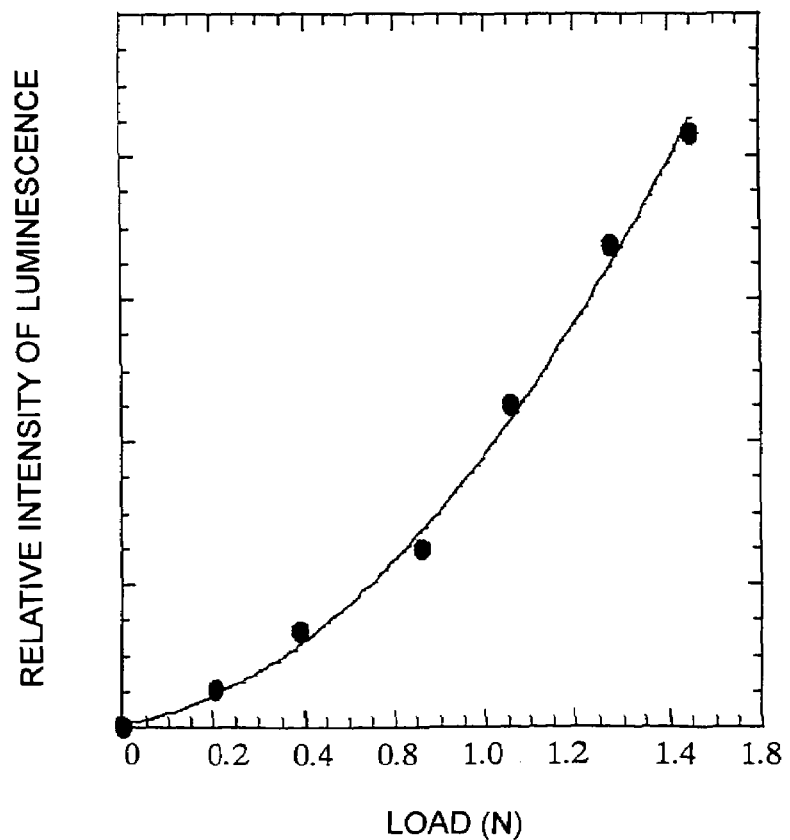
FIG. 5 is a graph showing the relationship between loading weight and luminescence intensity in Example 1.

In the next place, the stress dependency of the luminescence intensity was obtained by determining the changes in the luminescence intensity under successive increase of the weight for loading. The results are shown in FIG. 5 as a graph. When this graph is utilized, it is possible to obtain the value of the mechanical interaction force applied by determining the luminescence intensity.

EXAMPLES 2 TO 10

In the same manner as in Example 1, 9 kinds of mechanoluminescence materials having different compositions and different crystal grain diameters as shown in Table 1 were prepared. The grain diameters of the crystal grains and the relative luminescence intensities against the luminescence intensity of $SrAl_2O_4$:Eu taken as 100 as determined for these materials are shown in Table 1.

TABLE 1

| Sample | Composition | Relative luminescence intensity | Crystal grain diameter (nm) |
|---|---|---|---|
| Control | $SrAl_2O_4$:Eu | 100 | 50 |
| Example 1 | 0.99ZnCuS · 0.01MnS | 3124000 | 10 |
| Example 2 | 0.9ZnTe · 0.1MnTe | 1999000 | 12 |
| Example 3 | 0.9ZnCuS · 0.1MnS | 51300 | 32 |
| Example 4 | 0.9ZnTe · 0.1CdSe | 4600 | 25 |
| Example 5 | 0.9CdS · 0.1MnS | 298 | 30 |
| Example 6 | 0.9CdSe · 0.1MnTe | 980 | 50 |
| Example 7 | 0.9ZnS · 0.1MnS | 869000 | 20 |
| Example 8 | 0.1ZnS · 0.9MnS | 5800 | 500 |
| Example 9 | 0.9ZnSe · 0.1CdTe | 6700 | 60 |
| Example 10 | 0.8ZnO · 0.2MnCuS | 1880 | 15 |

As is understood from this table, a high luminescence intensity is exhibited with those in which, in particular, $M^1$ is Zn or Zn with partial replacement with Cu, $M^2$ is Mn and $A^1$ and $A^2$ are each the same element as the other such as, for example, S or Te. Further, a strong luminescence intensity is exhibited as a trend when the crystal grain diameter does not exceed 20 nm.

INDUSTRIAL UTILIZABILITY

According to the present invention, a novel mechanoluminescence material is provided which emits strong luminescence by a mechanical outer force such as a rubbing force, shearing force, impact force, pressure, tension, torsion and others and, by using the same, a mechanical energy can be directly converted into the energy of light to give a possibility of utilization for sensors, displays, amusement instruments, examination of stress distributions and others.

The invention claimed is:

1. A high-brightness mechanoluminescence material consisting of a composite semiconductor crystal represented by the formula:

$$xM^1A^1 \cdot (1-x)M^2A^2$$

wherein $M^1$ is Mn or Eu, $M^2$ is Zn, Mn, Cd, Cu, Eu, Fe, Co, Ni, Mg or Ca, each of $A^1$ and $A^2$ is the same chalcogen with the proviso that $M^1A^1$ and $M^2A^2$ differ each from the other, and x is a positive number smaller than 1 and wherein the composite semiconductor crystal has a mixed structure of the wurtzite-type structure and the zincblende-type structure.

2. A method for the preparation of the high-brightness mechanoluminescence material consisting of a composite semiconductor crystal represented by the formula:

$$xM^1A^1 \cdot (1-x)M^2A^2$$

wherein each of $M^1$ and $M^2$ is, independently from the other, an element selected from Zn, Mn, Cd, Cu, Eu, Fe, Co, Ni, Mg and Ca, each of $A^1$ and $A^2$ is an atom selected independently from chalcogens, with the proviso that $M^1A^1$ and $M^2A^2$ differ each from the other, and x is a positive number smaller than 1 and wherein the composite semiconductor crystal has a mixed structure of the wurtzite-type structure and the zincblende-type structure, which comprises the steps of mixing source materials of the constituent ingredients; heating the thus obtained mixture in vacuum at a temperature lower than the sublimation point of the product to produce a composition represented by the formula $$xM^1A^1 \cdot (1-x)M^2A^2$$

wherein each of $M^1$ and $M^2$ is, independently from the other, an element selected from Zn, Mn, Cd, Cu, Eu, Fe, Co, Ni, Mg and Ca, each of $A^1$ and $A^2$ is an atom selected independently from chalcogens and x is a positive number smaller than 1, with the proviso that $M^1A^1$ and $M^2A^2$ differ each from the other; causing sublimation of the composition at a temperature equal to or higher than the sublimation point of the composition; and crystallizing the thus generated sublimate by condensation at a temperature lower than the sublimation point thereof.

\* \* \* \* \*